United States Patent [19]
Schmiegel

[11] Patent Number: 5,874,523
[45] Date of Patent: *Feb. 23, 1999

[54] SULFONATED PERFLUOROELASTOMER COMPOSITION HAVING IMPROVED PROCESSABILITY

[75] Inventor: Walter Werner Schmiegel, Wilmington, Del.

[73] Assignee: E. I. du Pont de Nemours and Company, Wilmington, Del.

[ * ] Notice: The term of this patent shall not extend beyond the expiration date of Pat. No. 5,789,509.

[21] Appl. No.: 971,955

[22] Filed: Nov. 17, 1997

Related U.S. Application Data

[60] Provisional application No. 60/031,755 Nov. 25, 1996.

[51] Int. Cl.$^6$ .............................. C08F 6/00; C08F 16/24
[52] U.S. Cl. ........................... 528/481; 526/229; 526/247
[58] Field of Search ..................... 526/247, 229; 528/481

[56] References Cited

U.S. PATENT DOCUMENTS

| | | | |
|---|---|---|---|
| 3,085,083 | 4/1963 | Schreyer | 260/87.5 |
| 3,738,923 | 6/1973 | Carlson et al. | 204/159.2 |
| 3,834,038 | 9/1974 | Janda | 34/1 |
| 3,956,000 | 5/1976 | Kuhls et al. | 106/270 |
| 3,960,821 | 6/1976 | Vogt et al. | 260/79.3 |
| 4,281,092 | 7/1981 | Breazeale | 526/247 |
| 4,394,489 | 7/1983 | Aufdermarsh | 525/370 |
| 4,525,539 | 6/1985 | Feiring | 525/326.3 |
| 4,713,418 | 12/1987 | Logothetis et al. | 525/200 |
| 4,791,081 | 12/1988 | Childress et al. | 502/62 |
| 4,879,362 | 11/1989 | Morgan | 526/247 |
| 5,051,479 | 9/1991 | Logothetis et al. | 525/197 |
| 5,285,002 | 2/1994 | Grootaert | 526/247 |
| 5,447,993 | 9/1995 | Logothetis | 525/272 |
| 5,589,558 | 12/1996 | Felix et al. | 526/247 |
| 5,677,389 | 10/1997 | Logothetis et al. | 525/340 |

FOREIGN PATENT DOCUMENTS

| | | | |
|---|---|---|---|
| 0129143 | 12/1984 | European Pat. Off. | 526/247 |
| 0220910 | 5/1987 | European Pat. Off. | |
| 0 226 668 | 7/1987 | European Pat. Off. | |
| 0 423 995 | 4/1991 | European Pat. Off. | |
| 0457255 | 11/1991 | European Pat. Off. | |
| 0 606 883 A1 | 7/1994 | European Pat. Off. | |
| 0648787 | 4/1995 | European Pat. Off. | |
| 0 735 095 | 10/1996 | European Pat. Off. | |
| 63-210157 | 8/1988 | Japan | 526/247 |
| 63-218715 | 9/1988 | Japan | 526/247 |
| 398085 | 2/1966 | Switzerland . | |
| 0953152 | 3/1964 | United Kingdom | 526/247 |
| WO 91/18930 | 12/1991 | WIPO . | |
| 95/22575 | 8/1995 | WIPO . | |
| WO 97/19982 | 6/1997 | WIPO . | |
| 97/19982 | 11/1997 | WIPO . | |

OTHER PUBLICATIONS

U.S. application No. 08/909,898, Schmiegel, filed Aug. 12, 1997.

Logothetis, Chemistry of Fluorocarbon Elastomers, *Prog. Polym. Sci. vol 14*, 1989 Pergamon Press plc, pp. 251–296.

*Primary Examiner*—Bernard Lipman
*Assistant Examiner*—N. Sarofim
*Attorney, Agent, or Firm*—Marilyn H. Bromels, Esq.

[57] ABSTRACT

Curable perfluoroelastomer compositions are prepared in the presence of an initiator system comprising a mixture of a persulfate salt and a reducing agent wherein the amount of reducing agent present is no more than 20 mole percent of the total initiator system. The perfluoroelastomer is isolated and decarboxylated, thereby providing a product having excellent processability.

8 Claims, No Drawings

SULFONATED PERFLUOROELASTOMER COMPOSITION HAVING IMPROVED PROCESSABILITY

CLAIM OF BENEFIT OF PRIOR APPLICATION

This application claims the benefit of U.S. Provisional Application No. 60/031,755, filed Nov. 25, 1996.

FIELD OF THE INVENTION

This invention relates to perfluoroelastomer compositions which have excellent processability, and which, when cured, have outstanding thermal stability and chemical resistance.

BACKGROUND OF THE INVENTION

Perfluoroelastomers (elastomeric perfluoropolymers) are polymeric materials which exhibit outstanding high temperature tolerance and chemical resistance. Consequently, such compositions are particularly adapted for use as seals and gaskets in systems in which elevated temperatures and/or corrosive chemicals are encountered. The outstanding properties of perfluoropolymers are largely attributable to the stability and inertness of the copolymerized perfluorinated monomer units which make up the major portion of the polymer backbone, e.g., tetrafluoroethylene and perfluoro(alkyl vinyl) ethers. In order to completely develop elastomeric properties, perfluoropolymers are typically crosslinked, i.e. vulcanized. To this end, a small percentage of cure site monomer is copolymerized with the perfluorinated monomer units. Cure site monomers containing at least one nitrile group, for example perfluoro-8-cyano-5-methyl-3,6-dioxa-1-octene, are especially preferred. Such compositions are described in U.S. Pat. No. 4,281,092 and 4,394,489; and in International Application WO 95/22575.

A recently-developed class of perfluoroelastomers having carbonyl-containing functional groups is disclosed in co-pending U.S. patent application Ser. No. 08/755,919, entitled "Fast-curing Perfluoroelastomer Compositions," filed Nov. 25, 1996. These polymers are characterized by having carbonyl-containing functional groups, including carboxyl groups, carboxylate groups, carboxamide groups, and mixtures thereof. Preferably, the carbonyl-containing functional groups are generated as a result of persulfate initiation of the polymerization reaction and the reaction is carried out in the absence of sulfite or bisulfite reducing agents. The carbonyl-containing perfluoroelastomers exhibit outstanding cure characteristics but they are difficult to process in certain end-uses because of their relatively high viscosity. A method for decreasing viscosity of the carbonyl-containing perfluoroelastomers is disclosed in co-pending U.S. patent application Ser. No. 08/755,946, entitled "Perfluoroelastomer Composition Having Improved Processability", filed Nov. 25, 1996 now abandoned. The resultant lower viscosity perfluoroelastomers are suitable for use in a wide variety of end-use applications and process easily.

It would also be desirable to have low viscosity analogues of other types of perfluoroelastomers, for example those containing mixed sulfonate/carboxylate end groups.

SUMMARY OF THE INVENTION

This invention is directed to a process for preparation of an uncured perfluoroelastomer composition comprising the steps of A) preparing a perfluoroelastomer having a plurality of carbonyl-containing functional groups selected from the group consisting of carboxyl endgroups, carboxylate endgroups, carboxamide endgroups, and mixtures thereof by copolymerizing a monomer mixture comprising
  a) a perfluoroolefin monomer, b) a perfluorovinyl ether monomer selected from the group consisting of perfluoro(alkyl vinyl) ethers, perfluoro(alkoxy vinyl) ethers, and mixtures thereof, and (c) a cure site monomer at a pressure of from 4–10 MPa, in the presence of a persulfate free radical initiator, wherein
    i) the feed ratio of monomer to initiator is controlled so that the ratio of the radical flux to the polymerization rate, Ri/Rp, is from about 10 to 50 millimoles per kilogram, and ii) no more than 20 mole percent of a reducing agent is present in the polymerization mixture, wherein the reducing agent is selected from the group consisting of sulfite and bisulfite reducing agents, and the mole percentage of reducing agent is based on the total moles of persulfate free radical initiator and reducing agent present in the polymerization mixture;
B) isolating said perfluoroelastomer having a plurality of carbonyl-containing functional groups and sulfonyl-containing functional groups; and
C) heating said isolated perfluoroelastomer having a plurality of carbonyl-containing functional groups and sulfonyl-containing functional groups at a temperature of at least 230° C. for a time sufficient to at least partially decarboxylate the perfluoroelastomer.

In addition, the present invention is directed to an uncured perfluoroelastomer composition prepared by a process comprising the steps of A) preparing a perfluoroelastomer having a plurality of carbonyl-containing functional groups selected from the group consisting of carboxyl end groups, carboxylate endgroups, carboxamide endgroups, and mixtures thereof by copolymerizing a monomer mixture comprising a) a perfluoroolefin monomer, b) a perfluorovinyl ether monomer selected from the group consisting of perfluoro(alkyl vinyl) ethers, perfluoro(alkoxy vinyl) ethers, and mixtures thereof, and c) a cure site monomer at a pressure of from 4–10 MPa, in the presence of a persulfate free radical initiator, wherein
  i) the feed ratio of monomer to initiator is controlled so that the ratio of the radical flux to the polymerization rate, Ri/Rp, is from about 10 to 50 millimoles per kilogram, and ii) no more than 20 mole percent of a reducing agent is present in the polymerization mixture, wherein the reducing agent is selected from the group consisting of sulfite and bisulfite reducing agents, and the mole percentage of reducing agent is based on the total moles of persulfate free radical initiator and reducing agent present in the polymerization mixture;
B) isolating said perfluoroelastomer having a plurality of carbonyl-containing functional groups and sulfonyl-containing functional groups; and
C) heating said isolated perfluoroelastomer having a plurality of carbonyl-containing functional groups and sulfonyl-containing functional groups at a temperature of at least 230° C. for a time sufficient to at least partially decarboxylate the perfluoroelastomer.

The invention is further directed to curable compositions comprising the product produced by the above-described process and a curing agent.

DETAILED DESCRIPTION OF THE INVENTION

The perfluoroelastomers of the present invention comprise a class of perfluoroelastomers wherein ionized or ionizable sulfonyl-containing endgroups are present, and ionized or ionizable carbonyl-containing endgroups are also generally present. By ionized or ionizable sulfonyl-containing endgroups is meant sulfonate endgroups and sulfonic acid endgroups, respectively. By ionized or ionizable carbonyl-containing endgroups is meant carboxylate endgroups or carboxylic acid endgroups, respectively. Preferably, no more than 50% of the endgroups will be represented by sulfonic acid or sulfonate endgroups because higher levels of such endgroups are detrimental to polymer processability.

The present invention also includes curable compositions comprising the above-described two types of perfluoroelastomers in combination with curatives.

Perfluoroelastomers are polymeric compositions having copolymerized units of at least two principal perfluorinated monomers. Generally, one of the principal comonomers is a perfluoroolefin while the other is a perfluorovinyl ether. Representative perfluorinated olefins include tetrafluoroethylene and hexafluoropropylene. Suitable perfluorinated vinyl ethers are those of the formula

$$CF_2=CFO(R_fO)_n(R_{f'}O)_mR_f \qquad (I)$$

where $R_f$ and $R_{f'}$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl) ethers includes compositions of the formula

$$CF_2=CFO(CF_2CFXO)_nR_f \qquad (II)$$

where X is F or $CF_3$, n is 0–5, and $R_f$ is a perfluoroalkyl group of 1–6 carbon atoms.

Most preferred perfluoro(alkyl vinyl) ethers are those wherein n is 0 or 1 and $R_f$ contains 1–3 carbon atoms. Examples of such perfluorinated ethers include perfluoro(methyl vinyl) ether and perfluoro(propyl vinyl) ether. Other useful monomers include compounds of the formula

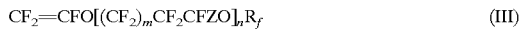

$$CF_2=CFO[(CF_2)_mCF_2CFZO]_nR_f \qquad (III)$$

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1. Additional perfluoro(alkyl vinyl) ether monomers include compounds of the formula

$$CF_2=CFO[(CF_2CFCF_3O)_n(CF_2CF_2CF_2O)_m(CF_2)_p]C_xF_{2x+1} \qquad (IV)$$

where m and n=1–10, p=0–3, and x=1–5.

Preferred members of this class include compounds where n=0–1, m=0–1, and x=1.

Examples of useful perfluoro(alkoxy vinyl) ethers include

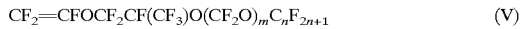

$$CF_2=CFOCF_2CF(CF_3)O(CF_2O)_mC_nF_{2n+1} \qquad (V)$$

where n=1–5, m=1–3, and where, preferably, n=1.

Mixtures of perfluoro(alkyl vinyl) ethers and perfluoro (alkoxy vinyl) ethers may also be used.

Preferred copolymers are composed of tetrafluoroethylene and at least one perfluoro(alkyl vinyl) ether as principal monomer units. In such copolymers, the copolymerized perfluorinated ether units constitute from about 15–50 mole percent of total monomer units in the polymer.

The perfluoropolymer further contains copolymerized units of at least one cure site monomer, generally in amounts of from 0.1–5 mole percent. The range is preferably between 0.4–1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \qquad (VI)$$

where n=2–12, preferably 2–6;

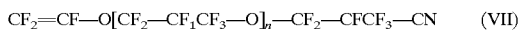

$$CF_2=CF-O[CF_2-CF_1CF_3-O]_n-CF_2-CFCF_3-CN \qquad (VII)$$

where n=0–4, preferably 0–2; and

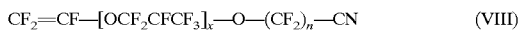

$$CF_2=CF-[OCF_2CFCF_3]_x-O-(CF_2)_n-CN \qquad (VIII)$$

where x=1–2, and n=1–4.

Those of formula (VIII) are preferred. Especially preferred cure site monomers are perfluorinated polyethers having a nitrile group and a trifluorovinyl ether group. A most preferred cure site monomer is

$$CF_2=CF[OCF_2CF(CF_3)]OCF_2CF_2CN \qquad (IX)$$

i.e. perfluoro(8-cyano-5-methyl-3,6-dioxa-1-octene) or 8-CNVE.

Other cure site monomers include olefins represented by the formula $R_1CH=CR_2R_3$, wherein $R_1$ and $R_2$ are independently selected from hydrogen and fluorine and $R_3$ is independently selected from hydrogen, fluorine, alkyl, and perfluoroalkyl. The perfluoroalkyl group may contain up to about 12 carbon atoms. However, perfluoroalkyl groups of up to 4 carbon atoms are preferred. In addition, the cure site monomer preferably has no more than three hydrogen atoms. Examples of such olefins include ethylene, vinylidene fluoride, vinyl fluoride, trifluoroethylene, 1-hydropentafluoropropene, and 2-hydropentafluoropropene as well as brominated olefins such as 4-bromotetrafluorobutene-1 and bromotrifluoroethylene.

An especially preferred perfluoroelastomer contains 53.0–79.9 mole percent tetrafluoroethylene, 20.0–46.9 mole percent perfluoro(methyl vinyl) ether and 0.4 to 1.5 mole percent nitrile-containing cure site monomer.

Any carbonyl-containing functional groups present in the perfluoroelastomers of this invention are either present as polymer endgroups or as pendant functionalities introduced as a result of copolymerization of fluorinated carbonyl-containing comonomers. For purposes of this invention carbonyl-containing endgroups are carboxylic acid endgroups, carboxylic acid salt endgroups, or carboxamide (i.e. amides of carboxylic acids) endgroups. By carbonyl-containing comonomer is meant a fluorinated monomer having a copolymerizable double bond and at least one pendant carboxylic acid group (including salts thereof), pendant carboxylic acid ester group, or pendant carboxamide group. Such comonomers are represented by compounds represented by formulas (X) and (XI):

$$CF_2=CFO(CF_2)_nX \qquad (X)$$

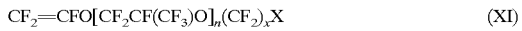

$$CF_2=CFO[CF_2CF(CF_3)O]_n(CF_2)_xX \qquad (XI)$$

where n=1–4,
x=2-5, and
X=$CO_2H$, $CO_2^-$, $CONH_2$, or $CO_2CH_3$

Depending on the carbonyl-containing comonomer selected, the resulting polymer would have carboxyl, carboxylate, or carboxamide (i.e. carboxylic acid amide) groups at any point on the chain, i.e. at the chain end, within the chain, or both.

Perfluoroelastomers having carboxyl or carboxylate endgroups can be prepared by polymerization of mixtures of perfluoroolefins and perfluorovinyl ethers in the presence of a free radical generating initiator either in bulk, in solution in an inert solvent, in aqueous suspension, or in aqueous emulsion. Perfluoroelastomer polymerization techniques are described in general in Logothetis, *Prog. Polymn. Sci*, Vol. 14, 252–296 (1989) and in U.S. Pat. No. 5,677,389. The Logothetis article discloses, among others, a method of polymerization involving initiation by persulfates, such as ammonium or potassium persulfate, in the absence of a reducing agent. Thermally initiated free-radical polymerization using persulfates in the absence of a reducing agent results in the production of polymers having carboxylic acid end groups which ionize to form carboxylate groups. Reducing agents include such compounds as sodium sulfite and sodium hydrogen sulfite.

If reducing agents are additionally present in the polymerization mixture, then perfluoroelastomers will be produced which contain a mixture of carboxylate, carboxylic acid, sulfonate, and sulfonic acid end groups. If the concentration of reducing agent present is more than 20 mole percent, based on the total number of moles of reducing agent and persulfate initiator present in the polymerization mixture, then processability of the isolated polymer is adversely affected. The presence of ionized or ionizable endgroups has detrimental effects on polymer processability, i.e., it increases as bulk viscosity. Processability of perfluoroelastomers having carboxyl-containing endgroups can be improved by decarboxylation. However, even after a decarboxylation step, those polymers prepared in the presence of greater than 20 mole percent reducing agent, based on the total of reducing agent and initiator, have relatively high viscosities and are consequently difficult to mill.

In order to produce the perfluoroelastomers of the present invention which are either free of carboxyl-containing endgroups or which have reduced amounts of such groups, decarboxylation of carboxylated perfluoroelastomers, such as those described above, is conveniently carried out by heat-treating the solid carboxylated perfluoroelastomers, which have been isolated and oven-dried. It is not necessary that the polymer be completely dry. That is, the polymer may be completely or partially dried prior to the decarboxylation process. In order to effect decarboxylation, the perfluoropolymer is heated to a temperature sufficiently high, and for a sufficiently long period of time, to decarboxylate all of the endgroups and convert them to non-ionizable substituents, for example, difluoromethyl groups or trifluorovinyl groups. This results in a lowering of polymer viscosity. Partially decarboxylated perfluoroelastomers are also useful compositions and may be prepared by heat treating the carboxylated perfluoroelastomer for shorter periods of time. Generally, a temperature of 230° C.–325° C. for a period of several minutes is sufficient to partially decarboxylate the polymer. Thus, a circulating air oven treatment of polymer crumb or sheet at temperatures of about 230° C.–325° C. is effective in removing a fraction or substantially all of the carbonyl-containing functional groups. Preferably, the polymer will be heated for 30 minutes at a temperature of 280° C.–320° C. If the temperature is below 250°, then decarboxylation may be too slow to be a commercially useful process. However, if potassium salts are used in the polymerization mixture, then the decarboxylation temperature can be lowered to 230° without reducing the rate of decarboxylation to a level which is commercially unacceptable. For example, the initiator may be potassium persulfate, and potassium salts may be used as buffers and surfactants. A suitable buffer is potassium dihydrogen phosphate and a suitable surfactant is potassium perfluorooctanoate. It is desirable to decarboxylate at the lower end of the temperature range to minimize any possibility of degradation of copolymerized cure site monomers. If the temperature is below 230° C., then decarboxylation is extremely slow. If the temperature is above 325° C., then the amount of cure site monomer in the polymer may be reduced by the heat treatment. At the lowest temperatures, the required heating time is much longer than at the highest temperatures and typical heating times range from about 5 minutes to about 24 hours. The decarboxylation can also be performed in a heated extruder, in a compression mold, or any other conventional heated elastomer processing equipment. The appropriate time will depend on the degree of decarboxylation desired. It is readily understood by those skilled in the art that other means of increasing the internal temperature of the polymer may be used, for example exposure to microwave radiation.

Unexpectedly, the perfluoroelastomers are not degraded by the heat treating process and retain their excellent response to vulcanization with a variety of curing agents. For example, it has been found that if copolymerized units of nitrile-containing cure site monomers, e.g. 8-CNVE, are present in the perfluoroelastomer, their concentration is essentially unaffected by a properly chosen heating cycle.

The decarboxylation process results in production of perfluoroelastomers having sulfonyl-containing endgroups and a reduced level of carboxyl-containing endgroups. The polymers have significantly lowered bulk viscosity compared to the non-decarboxylated polymers, thus improving processability. Another advantage of the lower bulk viscosity of the decarboxylated polymers is that decarboxylated polymers of higher molecular weight than would have been processable in the non-decarboxylated form can now be used commercially. These higher molecular weight polymers impart improved physical properties (e.g. tensile strength, compression set and reduced weight loss at high temperatures) to finished articles. The viscosity decrease is related to the reduction of ionic difunctionality which results from the heat treatment. Mooney viscosity, ML-10@121° C. decreases of at least 5% are typical upon complete decarboxylation.

Low viscosity perfluoroelastomer compositions may also be prepared by blending appropriate amounts of the decarboxylated and partially decarboxylated perfluoroelastomer compositions of the invention with a second perfluoroelastomer. The second perfluoroelastomer may have ionized or ionizable end groups, or it may be a perfluoroelastomer having bromine-containing groups or iodine-containing groups. The perfluoroelastomer blend compositions will exhibit physical properties typical of the perfluoroelastomer components. In addition, they will be characterized by enhanced processability, for example extrusion behavior and mixing properties.

The carbonyl content of the perfluoroelastomers of the invention may be determined by an integrated absorbance ratio method based on Fourier transform infrared analysis. Specifically, the total content of carboxyl, carboxylate, and carboxamide groups in the polymer is determined by measuring the integrated carbonyl absorbance (i.e. the total area of all peaks in the region 1620–1840 $cm^{-1}$) of thin polymer films using a Fourier transform IR spectrometer. In order to compare the carbonyl level in different polymer samples, integrated absorbance is normalized for differences in polymer film thickness by taking the ratio of the carbonyl integrated absorbance to the thickness band integrated absorbance. Thickness band integrated absorbance is the total area of all peaks in the region 2200–2740 cm$^{-1}$. The integrated absorbance of peaks in the latter region is proportional to the thickness of the polymer film. The integrated absorbance ratio can be readily used to calculate the concentration of carbonyl groups in the polymer by comparing the integrated absorbance ratio of the polymer to that of a standard polymer of known carboxyl or carboxylate content. Such standards may be prepared from polymers of this invention which have been heated in order to completely decarboxylate them, as described in co-pending U.S. patent application Ser. No. 08/755,919, entitled "Fast-curing Perfluoroelastomer Composition," filed Nov. 25, 1996. In the case where a carbonyl-containing cure site monomer is present in the polymer chain, the integrated absorbance due to the carbonyl group is subtracted from the total integrated absorbance in order to determine the concentration of the carbonyl-containing endgroups. Known amounts of a carbonyl-containing compound such as ammonium perfluorooctanoate may then be added to the substantially completely decarboxylated polymer in order to produce a calibration curve of integrated absorbance ratio versus concentration of ammonium perfluorooctanoate.

Perfluoroelastomer compositions of this invention also comprise compositions in which polymer plus curing agent is present. Generally, when used commercially, perfluoroelastomer compositions will be composed of a polymeric component, a curing agent, and optional additives. The polymeric component is a perfluoroelastomer of the types described above.

When the perfluoroelastomer has copolymerized units of a nitrile-containing cure site monomer, and the polymer is substantially free of carbonyl-containing functional groups, a cure system based on an organotin compound can be utilized. Suitable organotin compounds include allyl-, propargyl-, triphenyl- and allenyl tin curatives. Tetraalkyltin compounds or tetraaryltin compounds are the preferred curing agents for use in conjunction with nitrile-substituted cure sites. The amount of curing agent employed will necessarily depend on the degree of crosslinking desired in the final product as well as the type and concentration of reactive moieties in the perfluoroelastomer. In general, about 0.5–10 phr of curing agent can be used, and 1–4 phr is satisfactory for most purposes. It is believed that the nitrile groups trimerize to form s-triazine rings in the presence of curing agents such as organotin, thereby crosslinking the perfluoroelastomer. The crosslinks are thermally stable, even at temperatures of 275° C. and above. It has been found that the decarboxylated or partially-decarboxylated perfluoroelastomers have an unacceptably slow cure rate when compounded in accordance with conventional organotin curative recipes unless an accelerator is added. In particular, it has been found that organic or inorganic ammonium salts are unusually effective accelerators. Preferred accelerators include ammonium perfluorooctanoate, ammonium perfluoroacetate, ammonium thiocyanate, and ammonium sulfamate. These accelerators are disclosed in U.S. Pat. No. 5,677,389, and are generally used in quantities of 0.1–2.0 parts per hundred parts perfluoroelastomer, preferably in quantities of 0.5–1.0 parts per hundred parts perfluoroelastomer. In addition, ammonium salts of organic and inorganic acids may be used as curing agents. Suitable ammonium salts and quantities effective for curing perfluoroelastomers are disclosed in U.S. Pat. No. 5,565,512. Fast-curing perfluoroelastomer compositions wherein the perfluoroelastomer component has a plurality of carbonyl-containing functional groups and the curative is an organotin curative are disclosed in co-pending U.S. patent application Ser. No. 08/755,919, entitled "Fast-curing Perfluoroelastomer Compositions," filed Nov. 25, 1996.

A preferred cure system, useful for perfluoroelastomers containing nitrile-containing cure sites utilizes bis (aminophenols) of the formulas

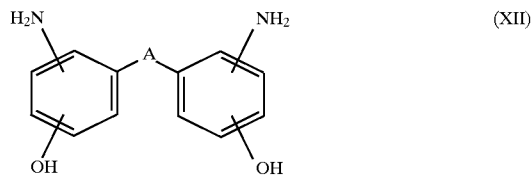

and

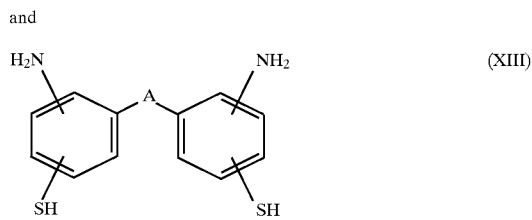

and tetraamines of the formula

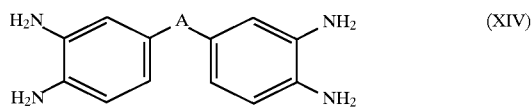

where A is $SO_2$, O, CO, alkyl of 1–6 carbon atoms, perfluoroalkyl of 1–10 carbon atoms, or a carbon-carbon bond linking the two aromatic rings. The amino and hydroxyl groups in formulas XII and XIII above, are interchangeably in the meta and para positions with respect to the group A. Preferably, the curing agent is a compound selected from the group consisting of 4,4'-[2,2,2-trifluoro-1-(trifluoromethyl) -ethylidene]bis(2-aminophenol); 4,4'-sulfonylbis(2-aminophenol); 3,3'-diaminobenzidine; and 3,3',4,4'-tetraaminobenzophenone. The first of these is the most preferred and will be referred to as bis(aminophenol) AF. The curing agents can be prepared as disclosed in U.S. Pat. No. 3,332,907 to Angelo. Bis(aminophenol) AF can be prepared by nitration of 4,4'-[2,2,2-trifluoro-1-(trifluoromethyl) ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. The level of curing agent should be chosen to optimize the desired properties of the vulcanizate. In general, a slight excess of curing agent over the amount required to react with all the cure sites present in the polymer is used. Typically, 0.5–5.0 parts by weight of the curative per 100 parts of polymer is required. The preferred range is 1.0–2.0 parts.

Peroxides may also be utilized as curing agents. Useful peroxides are those which generate free radicals at curing temperatures. A dialkyl peroxide which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2, 5-di(tertiarybutylperoxy)hexyne-3 and 2,5-dimethyl-2,5-di (tertiarybutylperoxy)hexane. Other peroxides can be selected from such compounds as dicumyl peroxide, dibenzoyl peroxide, tertiarybutyl perbenzoate, and di[1,3-dimethyl-3-(t-butylperoxy)-butyl]carbonate. Generally, about 1–3 parts of peroxide per 100 parts of perfluoroelastomer is used. Another material which is usually blended with the composition as a part of the curative system is a coagent composed of a polyunsaturated compound which is capable of cooperating with the peroxide to provide a useful cure. These coagents can be added in an amount equal to 0.1 and 10 parts per hundred parts perfluoroelastomer, preferably between 2–5 parts per hundred parts perfluoroelastomer. The coagent may be one or more of the following compounds: triallyl cyanurate; triallyl isocyanurate; tri (methylallyl isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate.

Depending on the cure site monomers present, it is also possible to use a dual cure system. For example, perfluoroelastomers having copolymerized units of nitrile-containing cure site monomers can be cured using a curative comprising a mixture of a peroxide in combination with an organotin curative and a coagent. Generally, 0.3–5 parts of peroxide, 0.3–5 parts of coagent, and 0.1–10 parts of organotin curative are utilized.

Additives, such as carbon black, stabilizers, plasticizers, lubricants, fillers, and processing aids typically utilized in perfluoroelastomer compounding can be incorporated into the compositions of the present invention, provided they have adequate stability for the intended service conditions. In particular, low temperature performance can be enhanced by incorporation of perfluoropolyethers.

Carbon black fillers are used in elastomers as a means to balance modulus, tensile strength, elongation, hardness, abrasion resistance, conductivity, and processability of the compositions. In perfluoroelastomer compositions, small particle size, high surface area carbon blacks have been the fillers of choice. A grade commonly chosen is SAF carbon black, a highly reinforcing black with typical average particle size of about 14 nm and designated N 110 in Group No. 1, according to ASTM D-1765. The particular carbon blacks useful in the compositions of the present invention are those described in WO 95/22575. These particular carbon blacks have average particle sizes of at least about 100 nm to about 500 nm as determined by ASTM D-3849. Examples include MT blacks (medium thermal black) designated N-991, N-990, N-908, and N-907, and large particle size furnace blacks. MT blacks are preferred. When used, 1–70 phr of large size particle black is generally sufficient, and this amount does not retard cure time.

In addition, fluoropolymer fillers may also be present in the composition. Generally from 1 to 50 parts per hundred perfluoroelastomer of a fluoropolymer filler is used, and preferably at least about 5 parts per hundred parts perfluoroelastomer is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

Micropowders that can be used in the composition of the invention include, but are not limited to, those based on the group of polymers known as tetrafluoroethylene (TFE) polymers. This group includes homopolymers of TFE (PTFE) and copolymers of TFE with such small concentrations of at least one copolymerizable modifying monomer that the resins remain non-melt-fabricable (modified PTFE). The modifying monomer can be, for example, hexafluoropropylene (HFP), perfluoro(propyl vinyl) ether (PPVE), perfluorobutylethylene, chlorotrifluoroethylene, or another monomer that introduces side groups into the polymer molecule. The concentration of such copolymerized modifiers in the polymer is usually less than 1 mole percent. The PTFE and modified PTFE resins that can be used in this invention include both those derived from suspension polymerization and from emulsion polymerization.

High molecular weight PTFE used in production of micropowder is usually subjected to ionizing radiation to reduce molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE micropowder by appropriate control of molecular weight in the emulsion polymerization process, such as disclosed by Kuhls et al. in U.S. Pat. No. 3,956,000. Morgan, in U.S. Pat. No. 4,879,362, discloses a non-melt-fabricable, non-fibrillating modified PTFE produced by the emulsion (dispersion) polymerization process. This polymer forms platelets on shear blending into elastomeric compositions, instead of fibrillating.

TFE polymers also include melt-fabricable copolymers of TFE having sufficient concentrations of copolymerized units of one or more monomers to reduce the melting point significantly below that of PTFE. Such copolymers generally have melt viscosity in the range of $0.5-60\times10^3$ Pa.s, but viscosities outside this range are known. Perfluoroolefins and perfluoro(alkyl vinyl) ethers are preferred comonomers. Hexafluoropropylene and perfluoro(propyl vinyl) ether are most preferred. Melt fabricable TTE copolymers such as FEP (TFE/hexafluoropropylene copolymer) and PFA [TFE/perfluoro(propyl vinyl)ether copolymer] can be used, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

The curable compositions of the present invention are useful in production of gaskets, tubing, and seals. Such articles are produced by molding a compounded formulation of the curable composition with various additives under pressure, curing the part, and then subjecting it to a post cure cycle. The cured compositions have excellent thermal stability and chemical resistance. They are particularly useful in applications such as seals and gaskets for manufacturing semiconductor devices, and in seals for high temperature automotive uses.

EXAMPLE

To a 5575 ml, stirred, water-jacketed, stainless steel autoclave operated continuously at a temperature of 70° C. and a pressure of 4.1 MPa, is fed tetrafluoroethylene (TFE) and perfluoro(methyl vinyl) ether (PMVE) at the rates of 333 g/hour and 386 g/hour, respectively, using a diaphragm compressor. Perfluoro-(8-cyano-5-methyl-3,6-dioxa-1-octene) (8CNVE) is also fed at the rate of 21.1 g/hour. Each of two aqueous solutions is fed separately at the rate of 688 ml/hour. One of these solutions consists of 287 g of ammonium persulfate, 200 g disodium hydrogen phosphate, and 272 g ammonium perfluorooctanoate in 20 liters of deaerated, de-ionized water. The second solution consists of 39.6 g sodium sulfite, and 272 g ammonium perfluorooctanoate in 20 liters deaerated, de-ionized water. Polymer latex is removed continuously through a let-down valve and unreacted monomers are vented. The latex is coagulated by adding 9.5 liters latex, at ambient temperature, to 37.85 liters stirred, de-ionized water at 85° C., re-equilibrating the mixture at 85° C., and adding 3 liters of a solution of 50 g magnesium sulfate heptahydrate per liter of de-ionized water. The resulting slurry is stirred for one hour at 85° C., filtered, and then dried at 80° C. in a forced air oven for at least eighteen hours. The yield of polymer is approximately 350 g per liter of latex. The composition of the polymer is approximately 43 wt.% PMVE, 2.1 wt.% 8CNVE, and 54.9 wt.% TFE. The polymer is decarboxylated by heating in an air oven at 300° C. for one hour, thereby reducing the Mooney viscosity, ML-10@121° C.

I claim:

1. A process for preparation of an uncured perfluoroelastomer composition comprising the steps of A) preparing a perfluoroelastomer having a plurality of carbonyl-containing functional groups selected from the group consisting of carboxyl endgroups, carboxylate endgroups, carboxamide endgroups, and mixtures thereof by copolymerizing a monomer mixture comprising a) a perfluoroolefin monomer, b) a perfluorovinyl ether monomer selected from the group consisting of perfluoro(alkyl vinyl) ethers, perfluoro(alkoxy vinyl) ethers, and mixtures thereof, and c) a cure site monomer at a pressure of from 4–10 MPa, in the presence of a persulfate free radical initiator, wherein i) the feed ratio of monomer to initiator is controlled so that the ratio of the radical flux to the polymerization rate, Ri/Rp, is from about 10 to 50 millimoles per kilogram, and ii) no more than 20 mole percent of a reducing agent is present in the polymerization mixture, wherein the reducing agent is selected from the group consisting of sulfite and bisulfite reducing agents, and the mole percentage of reducing agent is based on the total moles of persulfate free radical initiator and reducing agent present in the polymerization mixture;

B) isolating said perfluoroelastomer having a plurality of carbonyl-containing functional groups and sulfonyl-containing functional groups; and C) heating said isolated perfluoroelastomer having a plurality of carbonyl-containing functional groups and sulfonyl-containing functional groups at a temperature of at least 230° C. for a time sufficient to at least partially decarboxylate the perfluoroelastomer.

2. A process of claim 1 wherein the heating in step C) takes place at a temperature within the range of 280° C.–320° C.

3. A process of claim 1 wherein step C) is accomplished by heating in an oven.

4. A process of claim 1 wherein step C) is accomplished by heating in an extruder.

5. A process of claim 1 wherein step C) is accomplished by heating in a compression mold.

6. A process of claim 1 wherein step C) is accomplished by heating using microwave radiation.

7. A process of claim 1 wherein the persulfate free radical initiator is potassium persulfate.

8. A process of claim 1 wherein the persulfate free radical initiator is ammonium persulfate.

* * * * *